(12) United States Patent
Beesley et al.

(10) Patent No.: US 6,826,713 B1
(45) Date of Patent: Nov. 30, 2004

(54) DIAGNOSTIC ACCESS TO PROCESSORS IN A COMPLEX ELECTRICAL SYSTEM

(75) Inventors: Michael Beesley, Hillsborough, CA (US); Ross Heitkamp, Mountain View, CA (US); Ashok Krishnamurthi, San Jose, CA (US); Kenneth Richard Powell, Palo Alto, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 649 days.

(21) Appl. No.: 09/751,937

(22) Filed: Jan. 2, 2001

(51) Int. Cl.[7] ............................................... G06F 11/00
(52) U.S. Cl. ........................ 714/25; 714/48; 713/2
(58) Field of Search .......................... 714/25, 48; 713/2

(56) References Cited

U.S. PATENT DOCUMENTS 5,163,052 A * 11/1992 Evans et al. ................ 714/31
5,708,775 A * 1/1998 Nakamura ................... 714/48
5,764,882 A * 6/1998 Shingo ........................ 714/11
5,793,946 A * 8/1998 Gauthier et al. ............. 714/25
6,564,318 B1 * 5/2003 Gharda et al. ................ 713/2

OTHER PUBLICATIONS

Microsoft Press Computer Dictionary, 1997, Microsoft Press, Third Edition, p. 376.*
Microsoft Press Computer Dictionary, 1997, Microsoft Press, Third Edition.*

* cited by examiner

Primary Examiner—Robert Beausoliel
Assistant Examiner—Michael Maskulinski
(74) Attorney, Agent, or Firm—Harrity & Snyder LLP

(57) ABSTRACT

A debugging and diagnostic system allows a developer to receive low-level diagnostic information from multiple processors in a complex electrical system. A bus connects a master processor to the processors to be debugged via corresponding receiver/driver circuits. The receiver/driver circuits receive serial information from the processors and transmit it to the bus. The master processor controls the receiver/driver circuits through a control logic circuit.

23 Claims, 4 Drawing Sheets

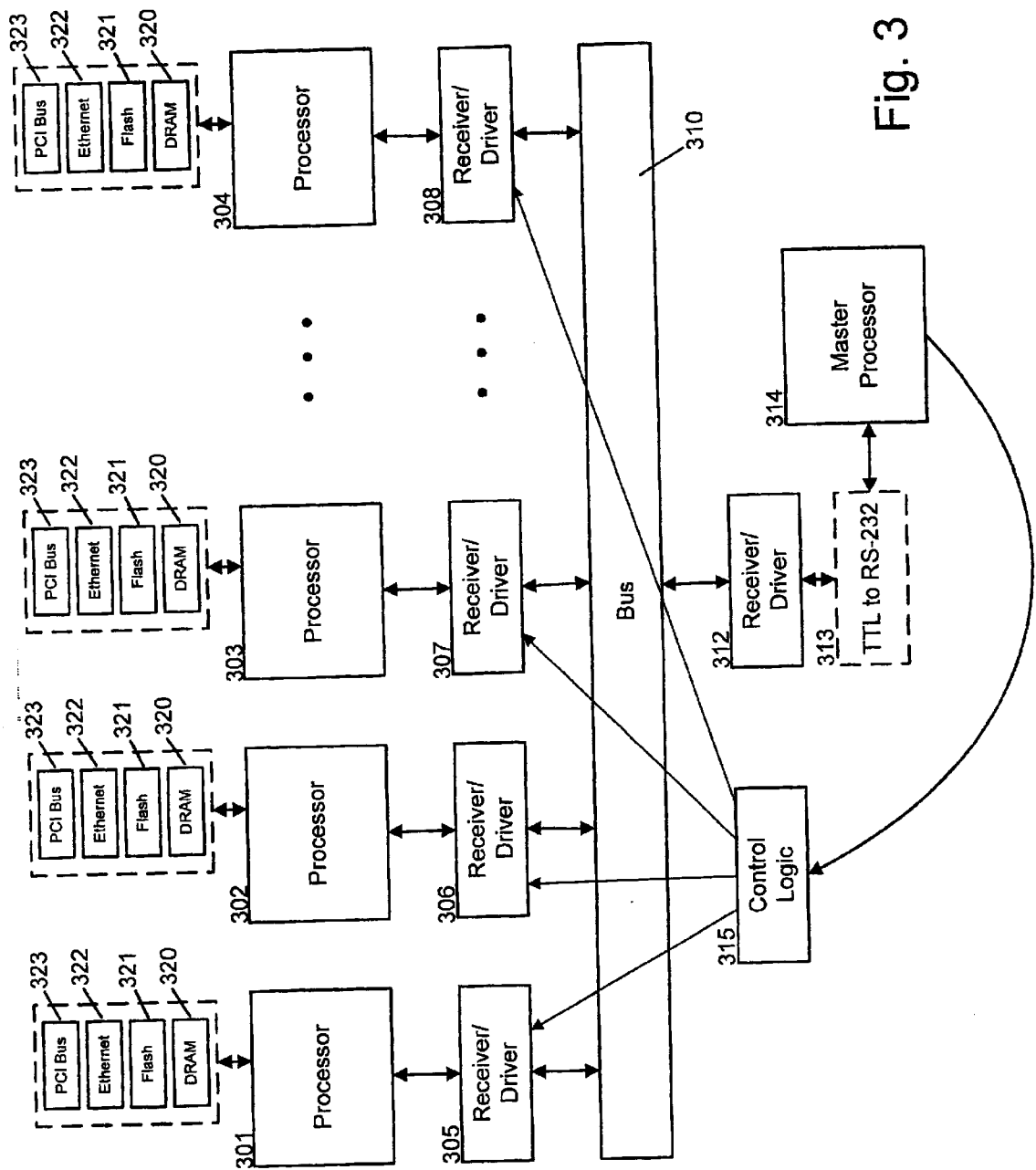

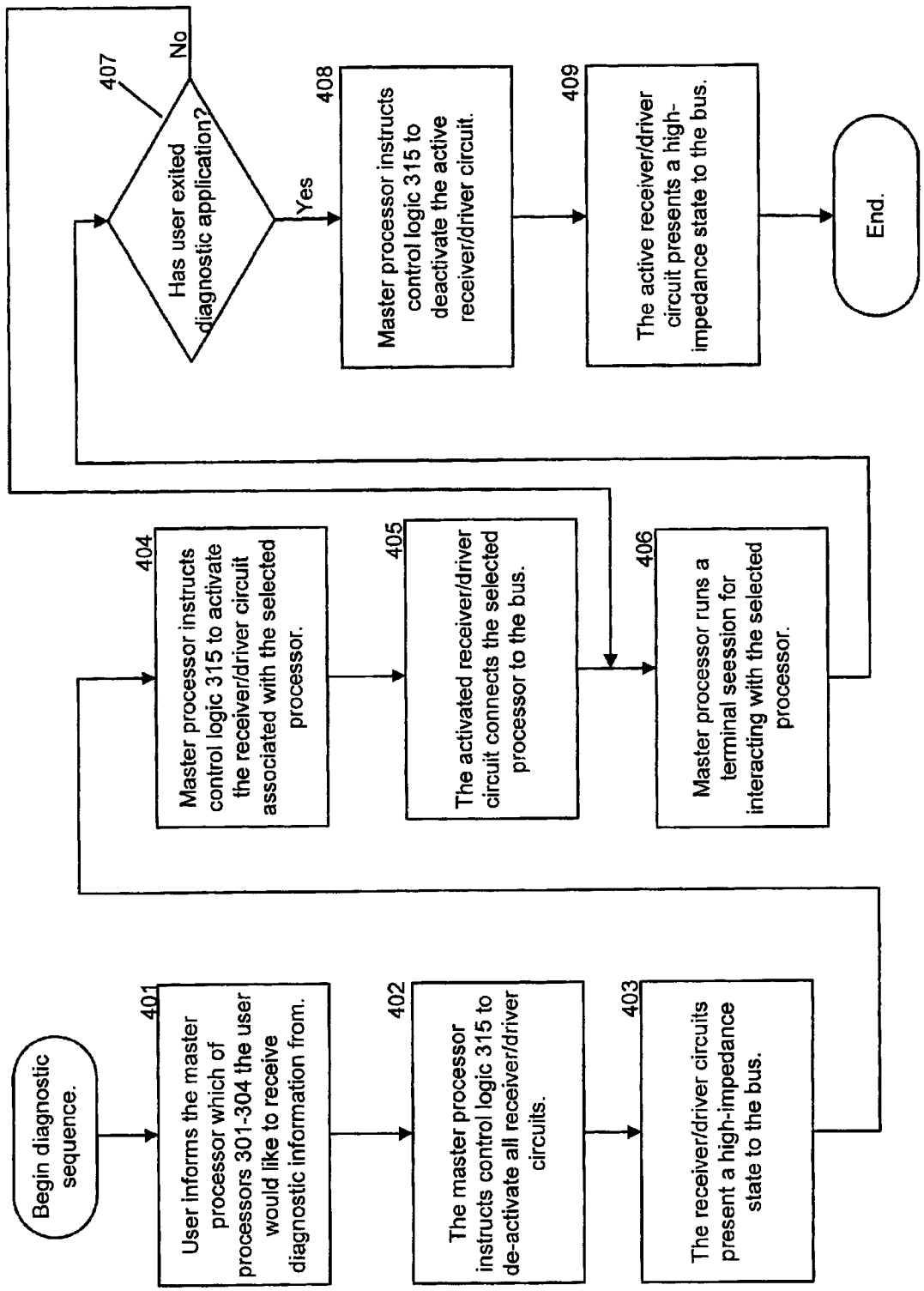

DIAGNOSTIC ACCESS TO PROCESSORS IN A COMPLEX ELECTRICAL SYSTEM

BACKGROUND OF THE INVENTION

A. Field of the Invention

The present invention relates generally to debugging and diagnostic systems and, more particularly, to systems that exchange diagnostic information with multiple processors in a complex electrical system.

B. Description of Related Art

Conventional networks typically include routers that route packets from one or more sources to one or more destinations. A packet is a variable size record that is transmitted through a network. A router is a network device that receives packets containing data and control information at input ports, and, based on destination or other information included in the packets, routes the packets to appropriate output ports that lead to either the next router in the packet's journey or to the packet's final destination. Routers determine the proper output port for a particular packet by evaluating header information included in the packet.

Routers, particularly high-performance routers, can be complex devices that include multiple processors and other circuitry integrated into a single physical box. For example, a router may include physical interface cards (PICs), modules for holding the physical interface cards (sometimes called flexible PIC concentrators), a routing engine, and switching and forwarding modules. Each one of these components may be implemented on a separate circuit board controlled by one or more processors. These circuit boards may then be mounted in a single physical frame to form the router.

Any of the multiple processors that control the circuit boards in the router may malfunction. Accordingly, it is desirable that the processors execute instructions that allow a designer to receive diagnostic or debugging information so that the designer can pinpoint and correct the problem. Conventionally, such processors included some type of high-level diagnostic ability, such as allowing a telnet session through an Ethernet port. Although such high-level diagnostic procedures can be useful, they are not helpful if the malfunction renders the high-level diagnostic protocol inoperative.

A further potential problem with conventional diagnostic protocols is that each processor may have a separate port that the user must physically connect a cable to in order to view the diagnostic information for that processor. Wiring each processor separately can require a lot of cable and can be inconvenient and awkward for the user, particularly in systems with a large number of processors, any of which can be difficult to access when physically secured in the complete system.

Accordingly, there is a need in the art to improve access to processor diagnostic information in complex multi-processor systems.

SUMMARY OF THE INVENTION

Systems and methods consistent with the present invention address this and other needs through a low-level debugging and diagnostic system implemented in a complex electrical system.

One aspect of the present invention is directed to a system comprising a number of processors implemented on circuit boards and a number of receiver/driver circuits each connected to a serial port of one of the plurality of processors. Additionally, a master processor is coupled to the receiver/driver circuits to select one of the plurality of processors as an active processor for communicating diagnostic information. to the master processor.

A second aspect of the present invention is directed to a method of obtaining diagnostic information from at least one of a number of processors in an electrical system. The method comprises receiving a request to receive diagnostic information from one of the processors and connecting the selected processor to a bus. Further, the non-selected processors are electrically insulated while the diagnostic information from the selected processor is received via a serial communication session transmitted over the bus. The selected processor is brought on-line by executing boot code, the boot code causing the selected processor to transmit the diagnostic information before the boot code is fully loaded.

A third aspect of the present invention is directed to a network device including a bus, a packet forwarding engine, and a routing engine. The packet forwarding engine has a plurality of circuit boards each including at least one processor and a receiver/driver circuit associated with each of the processors. The routing engine is connected to the bus and includes a master processor, the master processor selects one of the processors as an active processor for communicating diagnostic information by instructing the receiver/driver circuit associated with the selected processor to logically connect the selected processor to the bus.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 is a diagram broadly illustrating a system for receiving diagnostic and debugging information consistent with an aspect of the present invention; and FIG. 4 is a flow chart illustrating methods consistent with the present invention for receiving diagnostic and debugging information.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

As described herein, a low-level diagnostic system provides convenient diagnostic access to multiple processors in a complex electrical system. A single master processor controls which of the multiple processors are active. Because the diagnostic information is implemented as a low-level process within the processors, it is useful even if the processor fails to completely come on-line.

Figure 1:
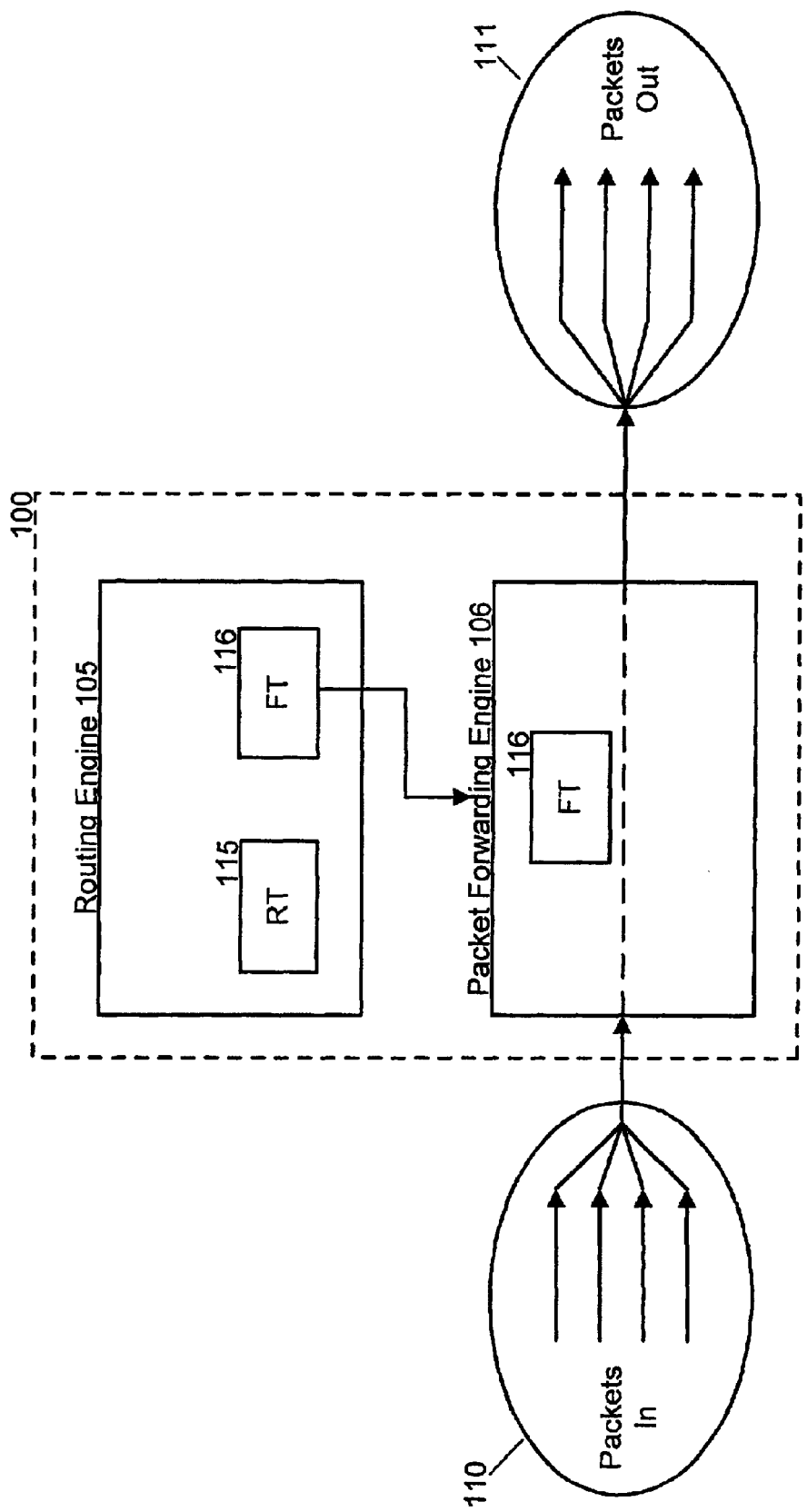
FIG. 1 is a diagram illustrating functional components of an exemplary router.

The processor monitoring and diagnostic system consistent with the present invention may be implemented in the context of a network device, such as a router. FIG. 1 is a diagram illustrating, at a high-level, functional components of an exemplary router 100. In general, router 100 receives incoming packets 110, determines the next destination (the next "hop" in the network) for the packets, and outputs the packets as outbound packets 111 on physical links that lead to the next destination. In this manner, packets "hop" from router to router in a network until reaching their final destination.

Router 100 includes routing engine 105 and a packet forwarding engine (PFE) 106. Routing engine 105 may maintain one or more routing tables (RTs) 115 and a forwarding table (FT) 116. Through routing tables 115, routing engine 105 consolidates routing information that the routing engine 105 learns from the routing protocols of the network. From this routing information, the routing protocol process may determine the active routes to network destinations and install these routes into forwarding table 116. Packet forwarding engine 106 may consult forwarding table 116 when determining the next destination for incoming packets 110.

Figure 2:
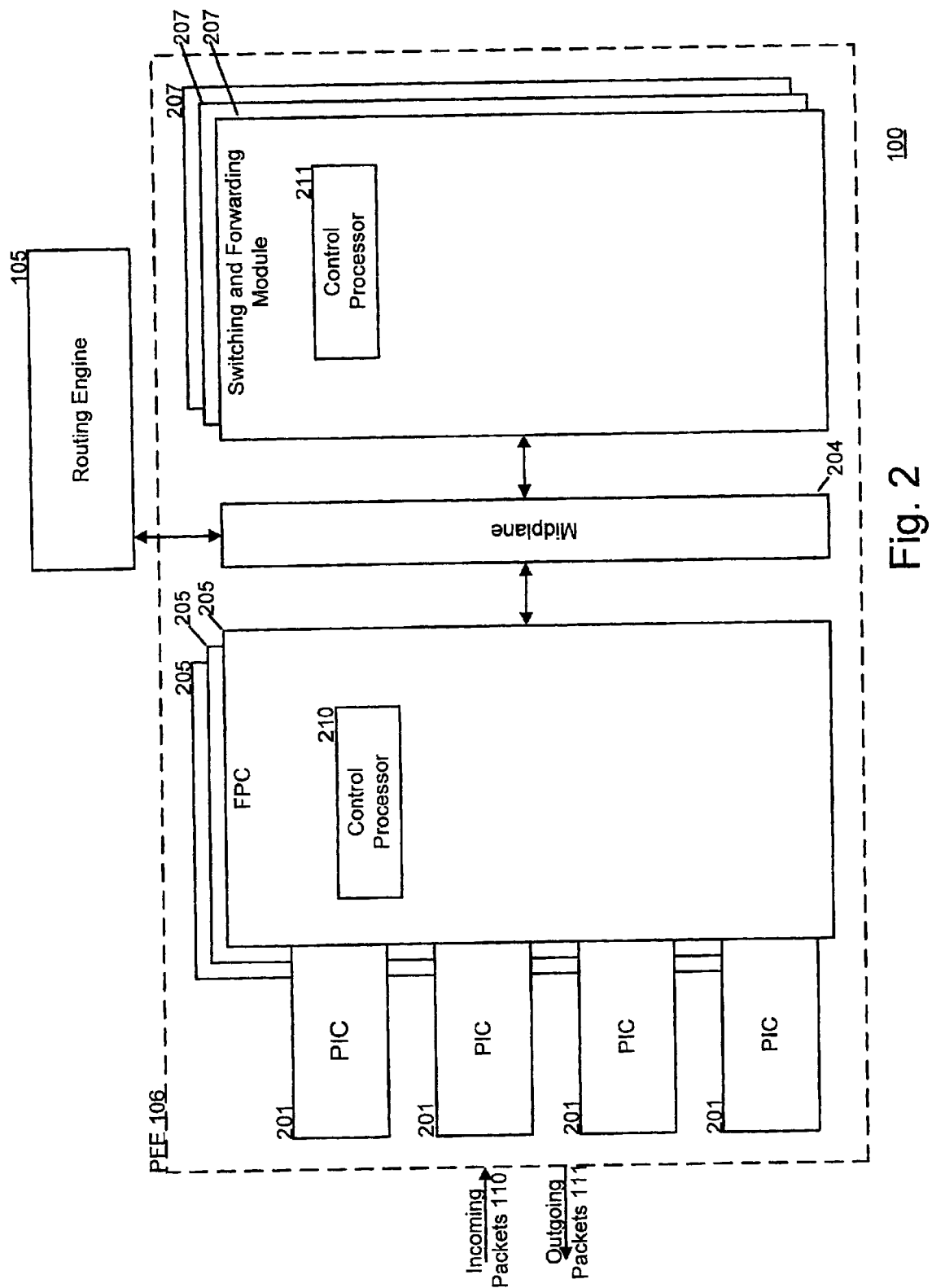
FIG. 2 is a more detailed illustration of the exemplary router shown in FIG. 1.

FIG. 2 is a more detailed illustration of exemplary router 100. PFE 106 generally handles input/output functions related to the incoming and outgoing packets 110 and 111, respectively. More particularly, PFE 106 receives the incoming packets through physical interface cards (PICS) 201, which forward the received packets to flexible PIC concentrators (FPCs) 205. Packet header information from the received packets is transmitted from FPCs 205 to switching and forwarding modules 207. Switching and forwarding modules 207 locate the destination of the packets by matching address information in the header to information in forwarding table 116. The processed header, including its destination PIC, may subsequently be received by FPCs 205, which reassemble and transmit the packet through the appropriate PIC 201. Midplane bus 204 connects routing engine 105, switching and forwarding modules (SFMs) 207, and FPCs 205. Midplane bus 204 may be implemented as part of the physical chassis of router 100.

Incoming packets 110 and outgoing packets 111 may be received by different PICs 201 over a number of different types of physical transmission standards. For example, the packets may be received through a Gigabit Ethernet connection, an optical connection (e.g., OC-3 or OC-12) over ATM (asynchronous transfer mode), or an optical connection over SONET (synchronous optical network). Each different physical interface standard may be handled by a specially designed PIC 201. Packets received by the router 100 at one of PICs 201, after processing, may be transmitted from the router 100 by another one of PICs 201. In general, each of PICs 201 perform media-specific processing, such as framing and checksum verification, for the packets received by the PIC 201. In this manner, router 100 can support packet routing over a network constructed using heterogeneous transmission components.

FPCs 205, switching and forwarding modules 207, PICs 201, and RE 105 may each include one or more control processors generally used to manage their operation. These control processors are illustrated as control processors 210 on FPCs 205 and control processors 211 on switching and forwarding modules 207. Physically accessing each of these processors 210 and 211 for diagnostic or debugging purposes was conventionally inconvenient and time consuming.

FIG. 3 is a diagram broadly illustrating a system for receiving diagnostic and debugging information consistent with an aspect of the present invention.

As shown in FIG. 3, processors 301–304 are each connected via a driver/receiver circuit 305–308 to a bus 310. Another driver/receiver circuit 312 connects a master processor 314 to bus 310. Master processor 314 is connected to control logic 315, which controls the operation of driver/receiver circuits 305–308. An optional TTL-to-RS 232 converter 313 may be used to convert TTL signals from driver/receiver circuit 312 to RS-232 signals for processing by master processor 314.

Each of processors 301–304 may be coupled to a number of different peripheral components, a non-exhaustive list of which includes dynamic random access memory (DRAM) 320, flash memory 321, an Ethernet port 322, and a PCI bus 323. Flash memory 321, for example, may be used to store computer instructions for booting-up the processor when it is initially turned-on.

Processors 301–304 may each be control processors such as processors 210 and 211, which are implemented in FPCs 205 and switching and forwarding modules 207. For example, processor 301 may be a control processor 210 in one of FPCs 205, processor 302 may be a control processor 210 in another one of FPCs 205, processor 303 may be a control processor implemented in one of switching and forwarding modules 207, and processor 304 may be a control processor implemented on another one of switching and forwarding modules 207. Master processor 314 may be implemented in routing engine 105.

Bus 310 connects processors 301–305 to master processor 314. Bus 310 may be implemented as a portion (i.e., one or more wires) of midplane bus 204.

In operation, as each of processors 301–304 are powered-up, the processor begins to come on-line by executing boot code (i.e., computer instructions for implementing the basic processing operations in flash memory 321). When the boot code is successfully loaded by the processor, the processor may begin to load a more complex operating system or application code from flash memory 321 or over Ethernet connection 322. Errors in either the boot code or the application code may cause the processor to fail to successfully boot up.

Each of processors 301–304 may be connected to its respective receiver/driver circuit 305–308 through a port such as a TTL UART port. UARTs (universal asynchronous receiver-transmitter) are well known components for handling asynchronous serial communication. The TTL UART port from each of processors 301–304 are low-level serial ports that require relatively few computer instructions from the boot code to begin functioning. Thus, the TTL UART port may be enabled early in the boot code sequence to provide diagnostic information as early as possible. Accordingly, each of processors 301–304 may begin transmitting a stream of status information to its respective receiver/driver circuit 305–308 as early as possible in its boot-up sequence, potentially even before the processor is capable of receiving commands from the receiver/driver circuit. In this manner, diagnostic and debug information can be received from a malfunctioning processor as early as possible—even before the boot code has fully loaded.

The operation of the debugging and diagnostic circuitry shown in FIG. 3 will now be described in more detail with reference to the flow chart of FIG. 4.

A diagnostic operation begins when the master processor 314 receives an indication from the user as to which of processors 301–304 the user would like to receive diagnostic information from. (Act 401). Master processor 314 then ensures that all the non-selected receiver/driver circuits are off-line by instructing control logic 315 to de-activate all of the receiver/driver circuits. (Act 402). In response, the receiver/driver circuits 305–308 present a high-impedance state to the bus. (Act 403). The master processor then instructs the control logic 315 to activate the receiver/driver circuit corresponding to the selected processor. (Act 404). In response, the receiver/driver connects the selected processor to the bus. (Act 405).

The receiver/driver circuit 312, corresponding to the master processor 314, operates similarly to receiver/driver circuits 305–308. More particularly, receiver/driver circuit 312 drives data from master processor 314 to bus 310 and passes data from bus 310 to master processor 314. Master processor 314 may communicate with processors 301–304 via an RS-232 port. In this situation, if the signals received by receiver/driver circuits 305–308 and 312 are TTL signals, optional TTL-to-RS 232 converter 313 converts between the TTL and RS-232 signals.

At this point, the master processor has established a communication path to the selected processor. The master processor can then begin running a terminal session application for interacting with the selected processor. (Act 406). Master processor 314, after establishing the terminal session with the active processor of processors 301–304, as performed in Acts 401–406, begins to receive status information from the active processor. Such information may be exchanged through TTL signals received from the selected processor and amplified and sourced to bus 310 by the active receiver/driver circuit. Similarly, signals on bus 310 are received by the active receiver/driver and passed to the selected processor of processors 301–304.

The communications link between the active processor and master processor 314 may be bi-directional, so that the master processor 314 can also transmit commands to the active processor. In this manner, the user can interactively send and receive diagnostic or debugging information from the active processor.

The terminal session may continue to run until the user exits the terminal application. (Act 407). At this point, the master processor instructs control logic 315 to deactivate the active receiver/driver circuit, which then presents a high impedance state to the bus. (Acts 408 and 409).

Although each of processors 301–304 and receiver/driver circuits 305–308 were illustrated as single components, these components could be redundantly implemented to provide a more highly fault tolerant system.

As described above, diagnostic access circuitry allows a user, acting through a master processor, to receive diagnostic or debugging information from a selected one or more processors. The user does not need to be able to physically access any of the processors. Further, the diagnostic access software in the processors may be implemented at a low-level, giving the user the ability to view the diagnostic information even though the processor fails to fully boot-up.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The scope of the invention is defined by the claims and their equivalents.

What is claimed:

1. A system comprising:
   a plurality of processors implemented on at least two circuit boards, each of the processors connected to a memory configured to store boot code for initially bringing each of the plurality of processors on-line, the boot code implementing diagnostic access functions that permit the processors to transmit diagnostic information before the boot code is fully loaded;
   a plurality of receiver/driver circuits each connected to a serial port of one of the plurality of processors;
   a master processor coupled to the receiver/driver circuits to select one of the plurality of processors as an active processor for communicating the diagnostic information to the master processor by instructing the receiver/driver circuit associated with the selected processor to logically connect the selected processor to the master processor; and
   a bus connecting the master processor to the receiver/driver circuits.

2. The system of claim 1, wherein each of the plurality of processors is a control processor for one of the circuit boards.

3. The system of claim 2, wherein the circuit boards are each inserted into a physical housing.

4. The system of claim 3, wherein the bus is implemented in the physical housing.

5. The system of claim 4, wherein the circuit boards each perform functional operations in a network router.

6. The system of claim 1, further including:
   control logic connected to the master processor and the receiver/driver circuits, the control logic activating, based on commands from the master processor, the selected one of the receiver/driver circuits and deactivating non-selected ones of the receiver/driver circuits.

7. The system of claim 6, wherein the non-selected ones of the receiver/driver circuits present high-impedance states to the bus.

8. The system of claim 1, further including:
   an additional receiver/driver circuit connecting the master processor to the bus.

9. The system of claim 8, wherein the plurality of receiver/driver circuits and the additional receiver/driver circuit communicate using TTL signals.

10. The system of claim 9, further including:
    a signal converter connected between the additional receiver/driver circuit and the master processor, the signal converter converting TTL signals for the additional receiver/driver circuit to RS-232 signals for the master processor.

11. A method of obtaining diagnostic information from at least one of a plurality of processors in an electrical system, the method comprising:
    receiving a request to receive diagnostic information from one of the plurality of processors;
    connecting the selected processor to a bus;
    electrically insulating non-selected processors of the plurality of processors from the bus; and
    receiving the diagnostic information from the selected processor via a serial communication session transmitted over the bus; wherein
    the selected processor being brought on-line by executing boot code, the boot code causing the selected processor to transmit the diagnostic information before the boot code is fully loaded.

12. The method of claim 11, wherein the serial communication session over the bus is implemented using TTL logic signals.

13. The method of claim 12, wherein each of the plurality of processors are located on a different circuit board.

14. The method of claim 13, wherein the bus is implemented in a physical housing of a network device.

15. A network device comprising:

a bus;

a packet forwarding engine having a plurality of circuit boards each including at least one processor, a receiver/driver circuit associated with each of the processors, and a memory connected to each of the processors and storing boot code for implementing diagnostic access functions that permit each of the plurality of processors to transmit diagnostic information before the boot code is fully loaded; and a routing engine, connected to the bus, including a master processor, the master processor selecting one of the processors as an active processor for communicating the diagnostic information by instructing the receiver/driver circuit associated with the selected processor to logically connect the selected processor to the bus.

16. The network device of claim 15, wherein the bus is implemented in a physical housing of the network device.

17. The network device of claim 15, wherein each of the processors is a control processor for the circuit board associated with the processor.

18. The network device of claim 16, wherein the circuit boards are each inserted into the physical housing.

19. The network device of claim 15, further including:

control logic connected to the master processor and the receiver/driver circuits, the control logic activating, based on commands from the master processor, the selected one of the receiver/driver circuits and deactivating non-selected ones of the receiver/driver circuits.

20. The network device of claim 19, wherein the non-selected ones of the receiver/driver circuits present high-impedance states to the bus.

21. The network device of claim 15, further including:

an additional receiver/driver circuit connecting the master processor to the bus.

22. The network device of claim 21, wherein the plurality of receiver/driver circuits and the additional receiver/driver circuit communicate using TTL signals.

23. The network device of claim 22, further including:

a signal converter connected between the additional receiver/driver circuit and the master processor, the signal converter converting TTL signals for the additional receiver/driver circuit to RS-232 signals for the master processor.

* * * * *